(12) United States Patent
Bordes et al.

(10) Patent No.: US 11,558,629 B2
(45) Date of Patent: Jan. 17, 2023

(54) CODING AND DECODING METHODS OF A PICTURE BLOCK, CORRESPONDING DEVICES AND DATA STREAM

(71) Applicant: INTERDIGITAL VC HOLDINGS, INC., Wilmington, DE (US)

(72) Inventors: Philippe Bordes, Laille (FR); Franck Hiron, Chateaubourg (FR); Pierre Andrivon, Liffre (FR); Patrick Lopez, Livre sur Changeon (FR); Philippe Salmon, Saint Sulpice la Foret (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 428 days.

(21) Appl. No.: 14/768,929

(22) PCT Filed: Feb. 17, 2014

(86) PCT No.: PCT/EP2014/053021
§ 371 (c)(1),
(2) Date: Aug. 19, 2015

(87) PCT Pub. No.: WO2014/128081
PCT Pub. Date: Aug. 28, 2014

(65) Prior Publication Data
US 2016/0007034 A1 Jan. 7, 2016

(30) Foreign Application Priority Data
Feb. 22, 2013 (EP) ..................................... 13305203

(51) Int. Cl.
*H04N 19/44* (2014.01)
*H04N 21/438* (2011.01)
(Continued)

(52) U.S. Cl.
CPC ........... *H04N 19/44* (2014.11); *H04N 19/176* (2014.11); *H04N 19/30* (2014.11); *H04N 19/50* (2014.11);
(Continued)

(58) Field of Classification Search
CPC ...... H04N 19/30; H04N 19/50; H04N 19/573; H04N 21/2358; H04N 21/4384
(Continued)

(56) References Cited

U.S. PATENT DOCUMENTS 6,393,057 B1    5/2002   Thoreau
6,466,624 B1   10/2002   Fogg
(Continued)

FOREIGN PATENT DOCUMENTS

CN         1250193        4/2000
CN         1484921        3/2004
(Continued)

OTHER PUBLICATIONS

Zhou etal: "efficient bit stream switching of H.264 coded video", proceedings of SPIE, the international society for optical engineering, vol. 5909, No. 1, 590911-1-11, Aug. 18, 2005.*
(Continued)

*Primary Examiner* — Kathleen V Nguyen
(74) *Attorney, Agent, or Firm* — Invention Mine LLC

(57) ABSTRACT

A method for decoding a picture block is disclosed. The decoding method comprises:
reconstructing reference picture from another reference picture of a decoder picture buffer of a first layer of a multi-layered stream and from data decoded from a second layer of said multi-layered stream and storing said reference picture in a decoder picture buffer of said second layer, wherein said reference picture is indicated as not to be displayed;
(Continued)

decoding a flag indicating that a subsequently decoded picture of the second layer is not using any inter-layer prediction; and reconstructing a picture block of said subsequently decoded picture at least from said reference picture.

21 Claims, 7 Drawing Sheets

(51) Int. Cl.
  *H04N 21/235*    (2011.01)
  *H04N 19/573*    (2014.01)
  *H04N 19/30*     (2014.01)
  *H04N 19/176*    (2014.01)
  *H04N 19/50*     (2014.01)

(52) U.S. Cl.
  CPC ....... *H04N 19/573* (2014.11); *H04N 21/2358* (2013.01); *H04N 21/4384* (2013.01)

(58) Field of Classification Search
  USPC ..................................................... 375/240.12
  See application file for complete search history.

(56) References Cited

U.S. PATENT DOCUMENTS

| | | |
|---|---|---|
| 6,480,541 B1 | 11/2002 | Girod |
| 6,542,541 B1 | 4/2003 | Luna |
| 6,574,273 B1 | 6/2003 | Luna |
| 6,748,018 B2 | 6/2004 | Sato |
| 6,850,568 B1 | 2/2005 | Williams |
| 7,706,447 B2 | 4/2010 | Karczewicz et al. |
| 8,199,812 B2 | 6/2012 | Ye |
| 8,201,207 B2 | 6/2012 | An |
| 8,213,452 B2 | 7/2012 | Hou |
| 8,311,102 B2 | 11/2012 | Lu et al. |
| 8,335,226 B2 | 12/2012 | Kolze |
| 8,638,852 B2 | 1/2014 | Karczewicz |
| 9,756,336 B2 | 9/2017 | Zhang |
| 9,813,738 B2 | 11/2017 | Tsai |
| 10,250,877 B2 | 4/2019 | Bordes |
| 2002/0118755 A1 | 8/2002 | Karczewicz |
| 2006/0093045 A1 | 5/2006 | Anderson |
| 2006/0117363 A1 | 6/2006 | Lee |
| 2007/0014349 A1 | 1/2007 | Bao et al. |
| 2007/0086521 A1 | 4/2007 | Wang |
| 2008/0212673 A1 | 9/2008 | Chen |
| 2009/0129471 A1 | 5/2009 | Kitajima |
| 2009/0175336 A1 | 7/2009 | Karczewicz |
| 2009/0274214 A1 | 11/2009 | Yoon et al. |
| 2010/0046622 A1* | 2/2010 | Doser ................. H04N 19/105 375/240.13 |
| 2010/0118938 A1* | 5/2010 | Fuchs ................... H04L 65/607 375/240.12 |
| 2010/0226437 A1 | 9/2010 | Robertson |
| 2012/0075436 A1* | 3/2012 | Chen .................... H04N 13/161 348/51 |
| 2012/0082241 A1 | 4/2012 | Tsai |
| 2012/0147953 A1 | 6/2012 | El-Mahdy |
| 2012/0155780 A1 | 6/2012 | Van Der Vleuten |
| 2013/0003847 A1 | 1/2013 | Hong |
| 2013/0114741 A1 | 5/2013 | Sullivan |
| 2014/0119440 A1* | 5/2014 | Lee ..................... H04N 19/503 375/240.12 |
| 2014/0133571 A1 | 5/2014 | Kim |
| 2016/0007034 A1 | 1/2016 | Bordes |
| 2016/0014419 A1 | 1/2016 | Bordes |
| 2016/0150242 A1 | 5/2016 | Zhang |

FOREIGN PATENT DOCUMENTS

| | | |
|---|---|---|
| CN | 101094406 | 12/2007 |
| CN | 101094406 A | 12/2007 |
| CN | 101395922 A | 3/2009 |
| CN | 102217272 A | 10/2011 |
| CN | 102550024 A | 7/2012 |
| EP | 1209916 | 5/2002 |
| EP | 2804375 | 11/2014 |
| JP | 2004517569 | 6/2004 |
| JP | 2010520678 | 6/2010 |
| JP | 2016511592 | 4/2016 |
| JP | 6259472 B2 | 1/2018 |
| RU | 2010133234 | 2/2012 |
| WO | 2008060262 A1 | 5/2008 |
| WO | WO2009088651 | 7/2009 |
| WO | WO2009136681 | 11/2009 |
| WO | WO2012039936 | 3/2012 |
| WO | 2012173439 A2 | 12/2012 |
| WO | WO2012173440 | 12/2012 |

OTHER PUBLICATIONS

Rickard Sjoberg et al: "overview of HEVC High-Level Syntax and Reference Picture Management", IEEE Transactions on Circuits and Systems for Video Technology, IEEE Service Center, Piscataway, NJ, US, vol. 22, No. 12, Dec. 1, 2012, pp. 1858-1870, XP011487804, ISSN: 1051-8215, DOI: 10.1109/TCSVT.2012.2223052, *the whole document*.*

Guo etal: "Wyner Ziv Switching Scheme for Multiple Bit Rate Video Streaming", IEEE transactions on circuits and systems for video technology, vol. 18, No. 5, pp. 569-581, May 2008.

Nam etal: "Dynamic Bitstream Switching Using Progressive S Frames for Scalable Video Transmission", IEEE transactions on consumer electronics, vol. 54, No. 4, pp. 1996-2002, Nov. 2008.

Zhou etal: "efficient bit stream switching of H264 coded video", proceedings of SPIE, the international society for opptical engineering, vol. 5909, No. 1, 590911-1-11, Aug. 18, 2005.

Bross etal: "High efficiency video coding HEVC text specification draft 7", JCTVC-11003-V4, Geneva, CH, Apr. 27-May 7, 2012.

ISO IEC 14496_10 AVC, Mar. 31, 2003.

Karczewicz etal: "The SP and SI frames design for H264 AVC", IEEE TCSVT, vol. 13, No. 7, Jul. 2003.

Setton etal: "video streaming with SP and SI frames", VCIP 2005.

Lopez_etal: "On flexible stream switching", Joint Collaborative Team on Video Coding (JCT-VC) of ITU-T SG 16 WP 3 and ISO/IEC JTC 1/SC 29/WG 11, 13th Meeting: Incheon, KR, Apr. 18-26, 2013.

Seregin etal: "SHVC HLS on adaptive resolution change based on single layer for non irap flag", Joint Collaborative Team on Video Coding (JCT-VC) of ITU-T SG 16 WP 3 and ISO/IEC JTC 1/SC 29/WG 11, 15th Meeting: Geneva, CH, Oct. 23-Nov. 1, 2013.

Bross_etal_High Efficiency Video Coding (HEVC) text specification draft 10, (for FDIS & Last Call), JCTVC-L1003-v34.

ITU_T Recommendation H264_AVC for generic audiovisual services, Jun. 2011.

JCTVC L1008_SHVC working draft text, Jan. 2013.

JCTVC L1009_common SHM test conditions and software reference configurations, Jan. 2013.

Lopez_etal_flexible stream switching based on HEVC, PCS 2013, Dec. 8-11, 2013, San Jose, CA, USA.

Stockhammer_Dash Design principles and standards, MMSys'11, Feb. 23-25, 2011, San Jose, California, USA.

Zhou_etal_enhanced video stream switching schemes for H264, MMSP2005.

Po-Chyi Su etal: "A Dynamic Video Streaming Scheme Based on SP/SI Frames of H.264/AVC", 41st International Conference on Parallel Processing workshops (ICPPW), 2012, IEEE, Sep. 10, 2012, pp. 524-529, XP032265731, DOI: 10.1109/ICPPW.2012.71, ISBN: 978-1-4673-2509-7, *the whole document*.

Wiegand T. etal: "Overview of the H.264/AVC video coding standard", IEEE transactions on circuits and systems for Video technology, IEEE service center, Piscataway, NJ, US, vol. 13 No. 7, Jul. 1, 2003, pp. 560-576, XP011221093, ISSN: 1051-8215, DOI: 10.1109-TCSVT.2003-815165, *the whole document*.

ITU T Rec H265_High efficiency video coding, Apr. 2015.

(56) References Cited

OTHER PUBLICATIONS

Chen etal: "High efficiency video coding (HEVC) scalable extension Draft 7_JCTVC-R1008_v7", Joint Collaborative Team on Video Coding (JCT-VC) of ITU-T SG 16 WP 3 and ISO/IEC JTC 1/SC 29/WG 11, 18th Meeting: Sapporo, JP, Jun. 30-Jul. 9, 2014.
Chen etal: "High efficiency video coding scalable extensions draft 5_JCTVC-P1008_v4", Joint Collaborative Team on Video Coding (JCT-VC) of ITU-T SG 16 WP 3 and ISO/IEC JTC 1/SC 29/WG 11 16th Meeting: San Jose, US, Jan. 9-17, 2014.
Samuelson: "SHVC skip pictures_JCTVC-O0199" Joint Collaborative Team on Video Coding (JCT-VC) of ITU-T SG 16 WP 3 and ISO/IEC JTC 1/SC 29/WG 11 15th Meeting: Geneva, CH, Oct. 23-Nov. 1, 2013.
Seregin: "AHG Report SHVC software_JCTVC-L0011", Joint Collaborative Team on Video Coding (JCT-VC) of ITU-T SG 16 WP 3 and ISO/IEC JTC 1/SC 29/WG 11 12th Meeting: Geneva, CH, Jan. 14-23, 2013.
Ugur: "Adaptive resolution change with SHVC_JCTVC-L0119", Joint Collaborative Team on Video Coding (JCT-VC) of ITU-T SG 16 WP 3 and ISO/IEC JTC 1/SC 29/WG 11 12th Meeting: Geneva, CH, Jan. 14-23, 2013.
Ghanbardi: "Two-Layers Coding of Video Signals for VBR Networks", IEEE journal on selected areas in comunication, vol. 7, No. 5, Jun. 1989.
Sun et al., / "Improved SP Coding Technique," Joint Video Team (JTV) of ISO/IEC MPEG & ITU-T VCEG (ISO/IEC JTC1/SC29/WG11 and ITU-T SG16 Q.6) 2nd Meeting, Geneva, CH, Jan. 29-Feb. 1, 2002 (11 pages).
International Search Report and Written Opinion of the International Searching Authority for PCT/EP2014/052998, dated May 12, 2014 (9 pages).
Bordes et al., "AHG18 resolution adaptation coding using single resolution in DPB", Joint Collaborative Team on Video Coding, 8th Meeting, San Jose, California, USA, Feb. 1, 2012, pp. 1-11 (11 pages).
Bross et al., "WD4 Working draft 4 of high efficiency video coding", Joint Collaborative Team on Video Coding, 6th Meeting: Torino, Italy, Jul. 14, 2011, pp. 1-231 (231 pages).
Davies et al., "AHG18 adaptive resolution coding (ARC)", Joint Collaborative Team on Video Coding, 7th Meeting, Geneva, Switzerland, Nov. 21, 2011, pp. 1-12 (12 pages).
Davies et al., "Jctvc Ahg report resolution adaptation", Joint Collaborative Team on Video Coding, 7th Meeting, Geneva, Switzerland, Nov. 21, 2011, pp. 1-2 (2 pages).
MPEG 4 ITU-T H264 Standard, "Advanced video coding for generic audiovisual", International Telecommunication Union, May 2003, pp. 1-282 (282 pages).
Davies et al.: "Resolution switching for coding efficiency and error resilience", (Joint collaborative team on video coding of ISO/IEC JTC1/SC29/WG11 and ITU-T SG16); Jul. 2011 (10 pages).
Li etal: "AHG18: Comments on the implementations of resolution adaption on HEVC", 7 JCT-VC Meeting (Joint Collaborative Team on Video Coding of ISO/IEC JTC1/SC29/WG11 ), Nov. 8, 2011 (12 pages).
Lee etal: "Hybrid resolution switching method for iow bit rate video coding", Image Processing, 2007, ICIP 2007, IEEE Intl Conf on IEEE, Sep. 1, 2007 pp. V1-73 (4 pages).
Wiegand etal: "WD3: Working draft 3 of high-efficiency video coding", doc No. JC1VC-E603, Mar. 2011, pp. 1-160 (160 pages).
Wittmann etal.: "Separable adaptive interpolation filter for video coding", Image processing, 2008.15TH IEEE Intl Conf, IEEE, Oct. 12, 2008, pp. 2500-2503 (4 pages).
Han etal: "Joint optimization of the motion estimation module and the Up/Down scaler in transcoders", IEEE transactions on circuits and systems for video technology. vol. 15, No. 10. Oct. 1, 2005, pp. 1303-1313 (12 pages).
Schwarz etal "Overview of the scalable video coding extension of the H.264/AVC standard", IEEE transactions on circuitsand systems for video tectinology. vol. 17, No. 9, Sep. 1, 2007, pp. 1103-1120 (18 pages).
International Search Report and Written Opinion for PCT/EP2013/050399 dated Feb. 8, 2013 (14 pages).

* cited by examiner

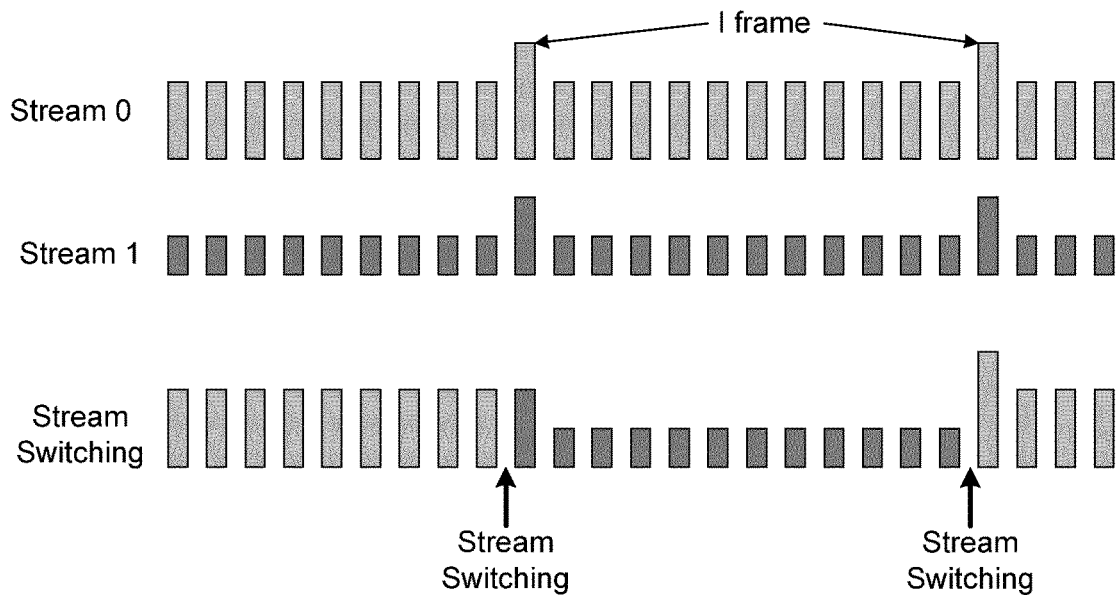
FIGURE 1 – State of the art
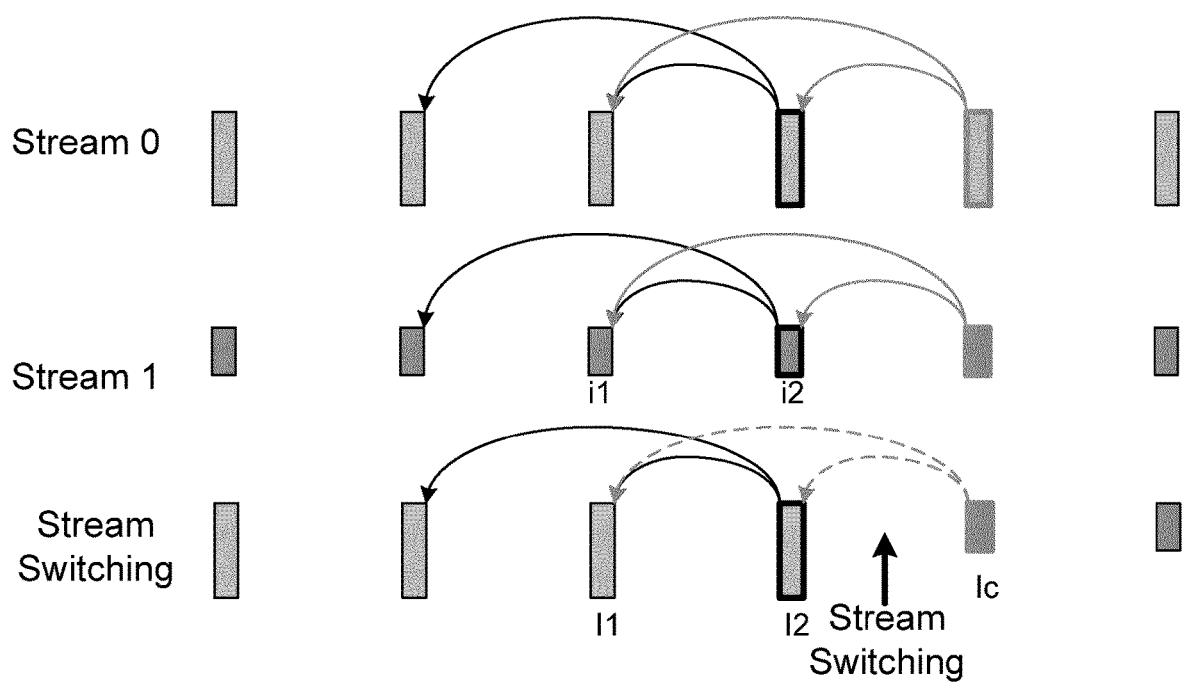
FIGURE 2 – State of the art

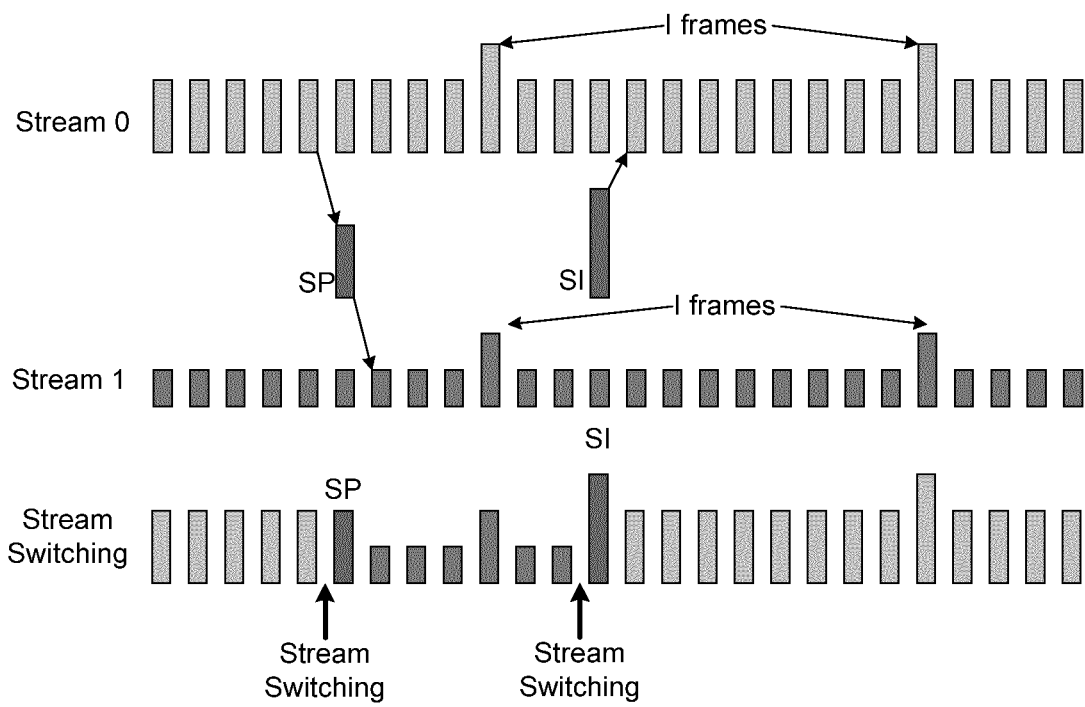
FIGURE 3– State of the art
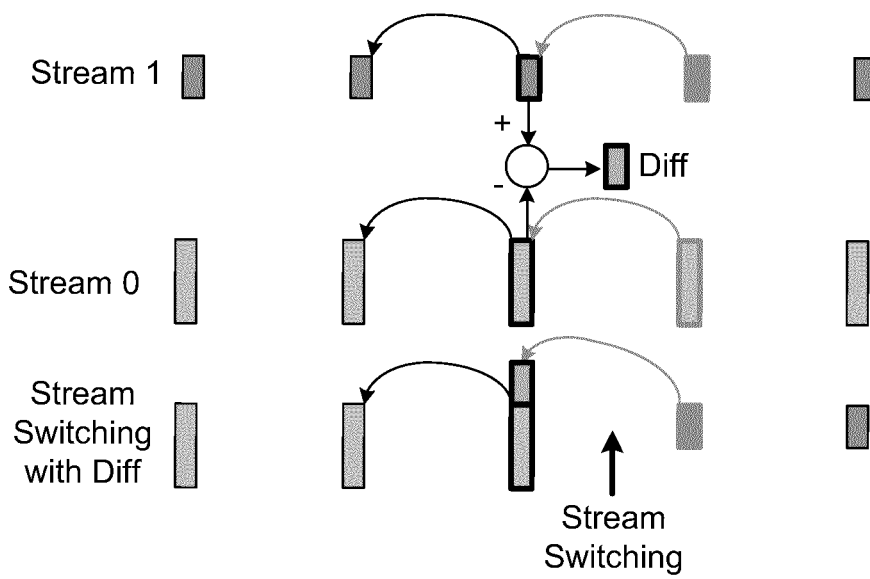
FIGURE 4– State of the art

CODING AND DECODING METHODS OF A PICTURE BLOCK, CORRESPONDING DEVICES AND DATA STREAM

This application is a national stage application under 35 U.S.C. § 371 of International Application PCT/EP2014/053021, filed Feb. 17, 2014, which was published in accordance with PCT Article 21(2) on Aug. 28, 2014 in English and which claims the benefit of European patent application EP13305203.5, filed Feb. 22, 2013.

1. FIELD OF THE INVENTION

A method for decoding a picture block from a special reconstructed reference picture is disclosed. Corresponding coding method and corresponding encoding and decoding devices are further disclosed.

2. BACKGROUND OF THE INVENTION

During video streaming, the bandwidth available may change over time. Consequently, the outgoing bit rate of the streaming application needs to be adjusted to fit the available bandwidth in real time in order to avoid congestion. One way to enable real-time bit rate adjustments is the use of a real-time encoder, but it needs to allocate one encoding system per client that may be unacceptable in case of numerous clients as for VOD services for example. Another way to enable real-time bit rate adjustments is the use of scalable video coding. In scalable coding, a video source is encoded into several layers. During the transmission in order to adjust the outgoing bit rate, the server selects the layers to be sent (mode "push") or the decoder asks for the layers to be sent (mode "pull"). The method is suitable for streaming over heterogeneous channels, but scalable video coding degrades the overall compression efficiency and increases the computational complexity of both the encoder and the decoder compared to single layer video coding. A simple method to realize bit rate adjustment is to encode multiple versions of the same video sequence. These versions have different resolution and/or quality levels and thus different bit rates. During the streaming, when there is a need to adjust the outgoing bit rate, the stream to be transmitted can be switched dynamically from one version to the other in order to fit the bandwidth requirement or user's capability as depicted on FIG. 1. This solution is known as "stream switching". However, directly switching between streams at inter-coded pictures (P or B pictures) may cause the mismatch of reconstructed reference pictures and results in incorrect pictures reconstruction. The quality of reconstructed video may be degraded significantly. One method to solve the problem is to use Random Access Points (RAP) in the bit-stream (typically I pictures or IDR pictures or CRA pictures). IDR is the English acronym of "Instantaneous Decoder Refresh" and CRA of "Clean Random Access". As switching can take place at these RAP only, the RAP need to be assigned frequently in the bit stream in order to realize prompt stream switching. However, encoding such I/IDR pictures introduce a substantial bit rate overhead. In addition, the pictures after the RAP that uses reconstructed reference pictures located before the RAP are either skipped or not decoded correctly because they use reconstructed reference picture(s) which is/are different from the one(s) used in the encoding as depicted on FIG. 2. On FIG. 2, Ic is reconstructed from reconstructed reference picture I1 and I2 while it was encoded from reconstructed reference picture i1 and i2.

In AVC, special picture types (SI/SP) were designed that allow for identical reconstruction of a picture from another stream and thus facilitate stream switching. Video pictures are thus encoded into SP pictures at switching points instead of intra-coded pictures as depicted on FIG. 3. The coding efficiency of the SP pictures is higher than that of intra-coded pictures, but they are still less efficient than normal P pictures. Therefore, the overall coding efficiency is still degraded if many switching points are assigned.

In the document from Zhou et al entitled "*Efficient bit stream switching of H.264 coded video*" and published in proc. of SPIE vol. 5909 (2005), a solution is disclosed that makes it possible to switch at any time without a substantial bit rate overhead. The solution is provided only for IPPP GOP structure. In addition to the multiple versions of the same video sequence at different bit rate, a DIFF picture is encoded for the reconstructed reference picture of the current picture on which the switch occurs as depicted on FIG. 4. The DIFF picture is the difference of the reconstructed reference picture of the current picture and the timely corresponding picture in the other stream. The difference picture is transmitted to the decoder to compensate the mismatch. As the DIFF picture is only transmitted when switching occurs as mentioned on page 5 of the document, the bit rate overhead introduced by the above scheme is small. On the other hand, the solution only works for P-picture predicted from a single reconstructed reference picture. In addition, this solution requires that the encoding order and the display order are identical.

3. BRIEF SUMMARY OF THE INVENTION

A method for decoding a picture block is disclosed. The method comprises:
  decoding at least one stream S_diff into decoded data and into one information for identifying a reconstructed reference picture in a decoder picture buffer;
  reconstructing a special reference picture from at least the identified reconstructed reference picture and from the decoded data;
  reconstructing the picture block from at least the special reference picture, wherein the special reference picture when reconstructed is not displayed.

Advantageously, the identified reconstructed reference picture is decoded from a first layer and wherein the decoded data and the information identifying the reconstructed reference picture in the decoder picture buffer are decoded from a second layer dependent from the first layer.

According to a specific characteristic, the first layer is a base layer.

According to a specific embodiment, the decoding method further comprises decoding a flag indicating that the subsequently decoded pictures of the second layer are not using any inter-layer prediction.

A method for encoding a picture block is also disclosed. The encoding method further comprises:
  encoding the picture block from at least one reconstructed reference picture; and
  encoding the at least one reconstructed reference picture as a special reference picture from another reconstructed reference picture and an information for identifying the another reconstructed reference picture in a decoder picture buffer, wherein the special reference picture when reconstructed is not displayed.

Advantageously, the identified reconstructed reference picture is encoded in a first layer and the at least one reconstructed reference picture and the information for identifying the another reconstructed reference picture in the decoder picture buffer are encoded in a second layer dependent from the first layer.

According to a specific characteristic, the first layer is a base layer.

According to a specific embodiment, further comprising encoding a flag indicating that the subsequently encoded pictures of the second layer are not using any inter-layer prediction.

A decoding device for decoding a picture block is disclosed. The decoding device comprises:
- means for decoding at least one stream S_diff into decoded data and into one information for identifying a reconstructed reference picture in a decoder picture buffer;
- means for reconstructing a special reference picture from at least the identified reconstructed reference picture and from the decoded data;
- means for reconstructing the picture block from at least the special reference picture, wherein the at least the special reference picture is not displayed.

The decoding device is adapted to execute the steps of the decoding method.

A coding device for encoding a picture block is disclosed. The coding device comprises:
- encoding the picture block from at least one reconstructed reference picture; and
- encoding the at least one reconstructed reference picture as a special reference picture from another reconstructed reference picture and an information for identifying the another reconstructed reference picture in a decoder picture buffer, wherein the special reference picture when reconstructed is not displayed.

The coding device is adapted to execute the steps of the encoding method.

Finally, a data stream is disclosed. The data stream comprises encoded in it one information for identifying a reconstructed reference picture in a decoder picture buffer and data allowing for the reconstruction of a special reference picture from the identified reconstructed reference picture, the special reference picture being a reference picture that is not displayed.

4. BRIEF DESCRIPTION OF THE DRAWINGS

Other features and advantages of the invention will appear with the following description of some of its embodiments, this description being made in connection with the drawings in which:

FIGS. 1 and 2 illustrate the general principles of stream switching;

FIG. 3 illustrates the principles of stream switching using SI/SP pictures according to the state of the art;

FIG. 4 illustrates the principles of stream switching using a DIFF picture according to the state of the art;

5. DETAILED DESCRIPTION OF THE INVENTION

Figure 5:
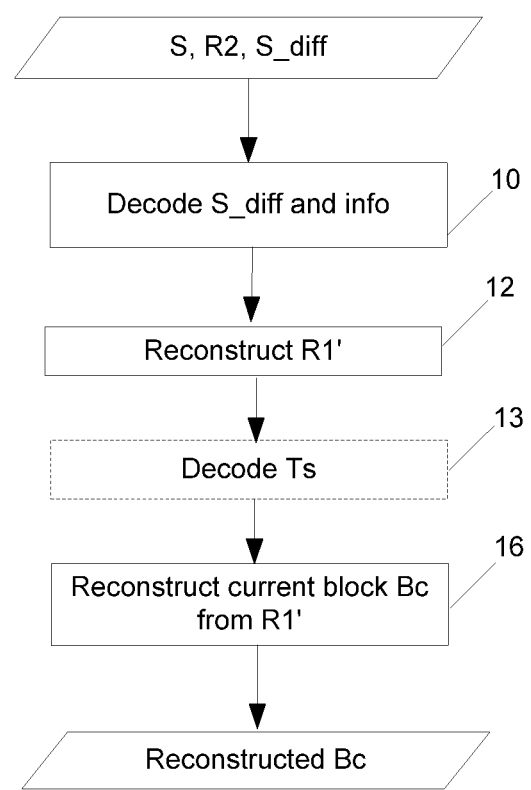
FIG. 5 depicts the flowchart of a decoding method according to the invention.

The invention relates to a method for decoding a picture block of pixels and a method for coding such a picture block. The picture block belongs to a picture of a sequence of pictures. Each picture comprises pixels or picture points with each of which at least one item of picture data is associated. An item of picture data is for example an item of luminance data or an item of chrominance data. Hereafter, the coding and decoding methods are described with reference to a picture block. It is clear that these methods can be applied on several picture blocks of a picture and on several pictures of a sequence with a view to the coding respectively the decoding of one or more pictures. A picture block is a set of pixels of any form. It can be a square, a rectangle. But the invention is not limited to such forms. In the following section the word block is used for picture block. In HEVC, the block refers to a Coding Unit (CU).

The "predictor" term designates data used to predict other data. A predictor is used to predict a picture block. A predictor or prediction block is obtained from one or several reconstructed reference sample(s) of the same picture as the picture to which belongs the block that it predicts (spatial prediction or intra-picture prediction) or from one (mono-directional prediction) or several reference blocks (bi-directional prediction or bi-prediction) of reconstructed reference pictures (temporal prediction or inter-picture prediction). A reference block is identified in a reconstructed reference picture by a motion vector. The prediction can also be weighted to account for an illumination variation model (a.k.a weighted prediction).

The term "residue" signifies data obtained after subtraction of a predictor from source data.

The term "reconstruction" designates data (e.g. pixels, blocks) obtained after merging a residue with a predictor. The merging is generally a sum of a predictor with a residue. However, the merging is more general and notably comprises an additional post filtering stage of reconstructed samples and/or an additional step of addition of offsets to the reconstructed samples. When a reference picture is reconstructed, it is stored in the DPB (English acronym of "Decoder Picture Buffer") as a newly reconstructed reference picture.

In reference to the decoding of pictures, the terms "reconstruction" and "decoding" are very often used as synonyms. Hence, a "reconstructed block" is also designated under the terminology "decoded block".

The term coding is to be taken in the widest sense. The coding possibly comprises applying a transform and/or quantizing data. It can also designate only the entropy coding. A DCT ("Discrete Cosine Transform) is an example of such a transform. In the same way, the term decoding possibly comprises in addition to the entropy decoding, applying a transform and/or an inverse quantization. The transform applied on the decoder side is an inverse transform of the one applied on the encoder side.

A stream is a sequence of bits that forms the representation of coded pictures and associated data forming one or more coded video sequences. Stream is a collective term used to refer either to a NAL unit stream or a byte stream.

A NAL (English acronym of "Network Abstraction Layer") unit is a syntax structure containing an indication of the type of data to follow and bytes containing that data. The NAL is specified to format that data and provide header information in a manner appropriate for conveyance on a variety of communication channels or storage media. All data are contained in NAL units, each of which contains an integer number of bytes. A NAL unit specifies a generic format for use in both packet-oriented and stream systems. The format of NAL units for both packet-oriented transport and byte stream is identical except that each NAL unit can be preceded by a start code prefix and extra padding bytes in the byte stream format.

An AU (English acronym of "Access Unit") is set of NAL units that are associated with each other according to a specified classification rule, are consecutive in decoding order, and contain exactly one coded picture. The decoding of an access unit always results in a decoded picture.

Figure 6:
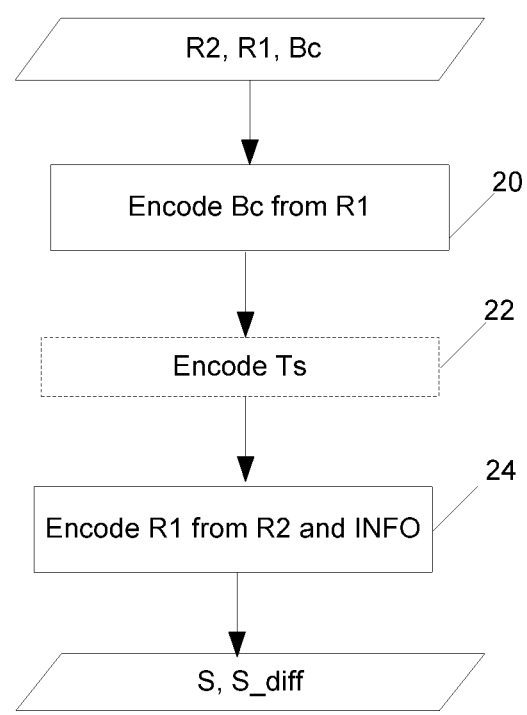
FIG. 6 depicts the flowchart of an encoding method according to the invention.

In the FIGS. 5 and 6, the represented boxes are purely functional entities, which do not necessarily correspond to physical separated entities. As will be appreciated by one skilled in the art, aspects of the present principles can be embodied as a system, method or computer readable medium. Accordingly, aspects of the present principles can take the form of an entirely hardware embodiment, an entirely software embodiment (including firmware, resident software, micro-code, and so forth), or an embodiment combining software and hardware aspects that can all generally be referred to herein as a "circuit," "module", or "system." Furthermore, aspects of the present principles can take the form of a computer readable storage medium. Any combination of one or more computer readable storage medium(s) may be utilized.

The flowchart and/or block diagrams in the figures illustrate the configuration, operation and functionality of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, or blocks may be executed in an alternative order, depending upon the functionality involved. It will also be noted that each block of the block diagrams and/or flowchart illustration, and combinations of the blocks in the block diagrams and/or flowchart illustration, can be implemented by special purpose hardware-based systems that perform the specified functions or acts, or combinations of special purpose hardware and computer instructions. While not explicitly described, the present embodiments may be employed in any combination or sub-combination.

FIG. 5 depicts the flowchart of a decoding method according to a specific and non-limitative embodiment. The method is for decoding a current picture block Bc encoded in a stream S. The picture block Bc belongs to a slice Sc of a current picture Ic. A slice is a part of a picture such as a set of picture blocks.

In a step 10, at least one stream S_diff is decoded into decoded data (e.g. residues and coding modes) and into an information INFO for identifying a reconstructed reference picture R2 stored in a DPB.

In a step 12, a special reference picture (whose English acronym is SRP) R1' is reconstructed from the identified reconstructed reference picture R2 and from the decoded data. The special reference picture is then placed in a DPB. This reference picture R1' is special because it is never displayed but only used to reconstruct blocks in other pictures. Reconstructing the SRP R1' comprises, for each picture block of R1', determining a predictor and adding a residue. The predictor may be determined from the identified reconstructed reference picture R2 (either as a block in R2 co-located to Bc or as a motion compensated block in R2 thus identified by a motion vector) or from neighboring reconstructed samples of R1' as in classical intra prediction. A block in R2 is co-located to Bc if its spatial position in R2 is identical to the spatial position of Bc in Ic. According to a variant, if the size of the reconstructed reference picture R2 is different from the size of the current picture Ic, then R2 is rescaled for the reconstruction of the special reference picture so that the rescaled R2 picture (possibly with appropriate padding) has the same size as Ic. In this case, R1' is reconstructed from F(R2), where F is a rescaling filter. The stream S_diff may be a part of stream S or may be independent of stream S.

As an example, the stream S_diff encodes the pixel by pixel difference between another reconstructed reference picture R1 different from R2 and the reconstructed reference picture R2. R1 is for example the reconstructed reference picture from which the current picture block Bc is encoded. In this case, decoding the stream S_diff comprises decoding a difference picture DIFF usually by entropy decoding, inverse quantization and transform. The transform is for example an inverse DCT. The difference picture is usually an approximation of the difference between the reconstructed reference picture R1 and the reconstructed reference picture R2. The approximation is due to the loss during encoding (e.g. because of the quantization). If the difference picture DIFF is lossless encoded, then the decoded difference picture DIFF equals the difference between the reconstructed reference picture R1 and the reconstructed reference picture R2. According to a variant, if R1 and R2 are of different sizes, the difference picture is the difference between the reconstructed reference picture R1 and the rescaled reconstructed reference picture R2. As an example, if R2 is larger than R1 then R2 is downscaled and if R2 is smaller than R1 then R2 is up-scaled. In this case, the special reference picture R1' equals F(R2)+DIFF, F is the identity if R2 and Ic are of same size or F is a rescaling function otherwise.

According to a variant, the decoding method further comprises an optional decoding of a sign associated with the difference picture DIFF. If such a sign is decoded, the special reference picture R1' equals F(R2)+DIFF when the sign is positive and equals F(R2)−DIFF when the sign is negative.

According to another variant, the stream S_diff encodes for some blocks of R1 the difference between these blocks and co-located blocks in R2. The other blocks of R1 are encoded in S_diff using classical intra prediction, i.e. from neighboring reconstructed samples.

According to another variant, the stream S_diff encodes for some blocks of R1 the difference between these blocks and corresponding blocks in R2. The corresponding blocks in R2 are either co-located blocks or motion compensated blocks. The other blocks of R1 are encoded in S_diff using classical intra prediction, i.e. from neighboring reconstructed samples.

Decoding the information INFO makes it possible to handle different use cases. As an example, if the current picture block Bc is encoded from two reconstructed reference pictures R1 and r1, then two special reference pictures R1' and r1' and two information INFO and info are decoded at step 10. The special reference pictures R1' and r1' correspond respectively to R2 and r2, where R2 and r2 are two reconstructed reference pictures stored in the DPB from which Bc is to be reconstructed. Consequently, INFO indicates to the decoder that R1' is to be reconstructed from R2 while info indicates that r1' is to be reconstructed from r2.

Each special picture is for example identified in the stream S_diff with a dedicated flag indicating a picture/slice type different from the classical I, P, B picture/slice type. This picture/slice type indicates that the current AU contains a special reference picture that is not displayed. According to a variant, each special picture is identified with a dedicated flag in the slice header.

According to a variant, the picture slice type is I, P or B, but a special flag in the slice header indicates the reconstructed picture is not displayed but stored as reference in the DPB.

The information INFO for identifying in the DPB a reconstructed reference picture R2 is for example a POC (English acronym of "Picture Order Count") as defined in the document ISO/IEC 14496-10 (section 3.104). According to a variant, the information for identifying a reconstructed reference picture is a reconstructed reference picture index.

In a step 16, the current picture block Bc is reconstructed from the special reference picture R1'. Usually, since the special reference picture is closer in terms of content to R1 than was R2, the drift is thus decreased. Usually, reconstructing a picture block comprises decoding a residue from the stream S and adding the residue to a predictor. The residue can be zero in case of skip mode. Decoding the residue comprises entropy decoding, inverse quantization and applying a transform inverse of the transform applied on the encoder side. These steps are well known to those skilled in the art of video compression/coding and are not disclosed further. A reference block in the special reference picture R1' is identified by a motion vector decoded from the stream S. The reference block is used as a predictor. In case of bi-prediction, two reference blocks are identified in two reconstructed reference pictures which are possibly one and the same reconstructed reference picture. The predictor is a weighted sum of these two reference blocks. If Bc is bi-predicted from two reference blocks belonging to two reconstructed reference pictures R2 and r2 which may be different from the reconstructed reference pictures R1 and r1 used in the encoding, then two SRPs R1' and r1' are possibly reconstructed. The special reference pictures R1' and r1' are thus used as reference pictures for Bc. Bc can also be reconstructed from one special reference pictures R1' and from r1, if r1 is available in the DPB when reconstructing Bc. INFO and sign can be decoded for each special reference picture (in a slice header or in a slice segment header) or may be grouped for several special reference pictures in one single header. INFO and sign are for example decoded from a SEI message, VPS (Video Parameter Set HEVC) or from the slice header of Sc.

FIG. 6 depicts the flowchart of an encoding method according to a specific and non-limitative embodiment. The method is for encoding a current picture block Bc in a stream S.

In a step 20, a current picture block Bc is encoded from at least one first reconstructed reference picture R1 in a stream S. Usually, encoding the current picture block comprises determining a residue, transforming the residue and quantizing the transformed residue into quantized data. The quantized data are further entropy coded in the stream S. The residue is obtained by subtracting from the current picture block Bc a predictor. The predictor is determined from the first reconstructed reference picture R1. More precisely, a predictor is determined in the reconstructed reference picture R1 by a motion vector. If the current block is bi-predicted from two reference blocks, a predictor is obtained by averaging these two reference blocks. The two reference blocks either belong to two different reconstructed reference pictures R1 and r1 or to one and the same reconstructed reference picture. Motion vectors are also encoded in the stream S. These steps are well known to those skilled in the art of video compression and are not disclosed further. In a step 24, the reconstructed reference picture R1 and an information INFO are encoded into the stream S_diff. The decoding of S_diff is a SRP. The stream S_diff may be a part of stream S or may be independent of stream S. The reconstructed reference picture R1 is encoded in S_diff from a second reconstructed reference picture R2 different from R1 that is identified by INFO. According to a variant, if the size of the reconstructed reference picture R2 is different from the size of the current picture Ic and thus from the size of R1, then R2 is rescaled for the encoding of the reconstructed reference picture R1 so that the rescaled R2 picture (possibly with appropriate padding) has the same size as Ic. In this case, R1 is encoded from F(R2), where F is an rescaling filter.

As an example, the stream S_diff encodes the pixel by pixel difference DIFF between R1 and R2. The DIFF picture is encoded by transformation (e.g. using a DCT), quantization and entropy coding. According to a variant, if R1 and R2 are of different sizes, the difference picture is the difference between the reconstructed reference picture R1 and the rescaled second reconstructed reference picture R2. As an example, if R2 is larger than R1 then R2 is downscaled and if R2 is smaller than R1 then R2 is up-scaled. In this case, DIFF=R1−F(R2), F is the identity function when R2 and Ic are of the same size and is a rescaling function otherwise.

According to a variant, the decoding method further comprises an optional decoding of a sign associated with the difference picture. If such a sign is decoded, the special reference picture R1' equals F(R2)+DIFF when the sign is positive and equals F(R2)−DIFF when the sign is negative.

According to another variant, the stream S_diff encodes for some blocks of R1 the difference between these blocks and blocks in R2 (i.e. either blocks co-located to Bc or motion compensated blocks). The other blocks of R1 are encoded in S_diff using classical intra prediction, i.e. from neighboring reconstructed samples.

Encoding the information INFO makes it possible to handle different use case. As an example, if the current picture block Bc is encoded from two reconstructed reference pictures R1 and r1, then the two reconstructed reference pictures are encoded from two other reconstructed reference pictures R2 and r2. INFO indicates to a decoder that a special reference picture R1' is to be reconstructed from R2 while info indicates that another special reference picture r1' is to be reconstructed from r2. Each special reference picture is for example identified in the stream S_diff with a dedicated flag indicating a picture/slice type different from the classical I, P, B picture/slice type. This picture/slice type indicates the current AU is a special reference picture that is to be used for replacing a picture in the DPB. According to a variant, each special picture is identified with a dedicated flag in the slice header.

According to a variant, the picture slice type is I, P or B, but a special flag in the slice header indicates the reconstructed picture is not displayed but stored as reference in the DPB.

In a specific embodiment, one special reference picture and an information INFO are encoded for several or each possible pairs of reconstructed reference picture of the DPB. Consequently at any time a block Bc can be reconstructed from any picture of the DPB even if it is not the one from which it was encoded while limiting the drift. Indeed, when reconstructing Bc, if R1 is not available in the DPB, Bc can be reconstructed from the special reference picture R1' instead of R2. The drift is thus limited because R1' is closer in terms of content to R1 than is R2.

The information identifying a second reconstructed reference picture is for example a POC. According to a variant, the information identifying a second reconstructed reference picture is a reconstructed reference picture index.

All the variants and options disclosed for the decoding method are applicable to the encoding method. In particular, the encoding method comprises an optional encoding of a sign associated with the difference picture.

INFO and sign are for example decoded from a SEI message, VPS (Video Parameter Set HEVC) or from the slice header of Sc.

Figure 7:
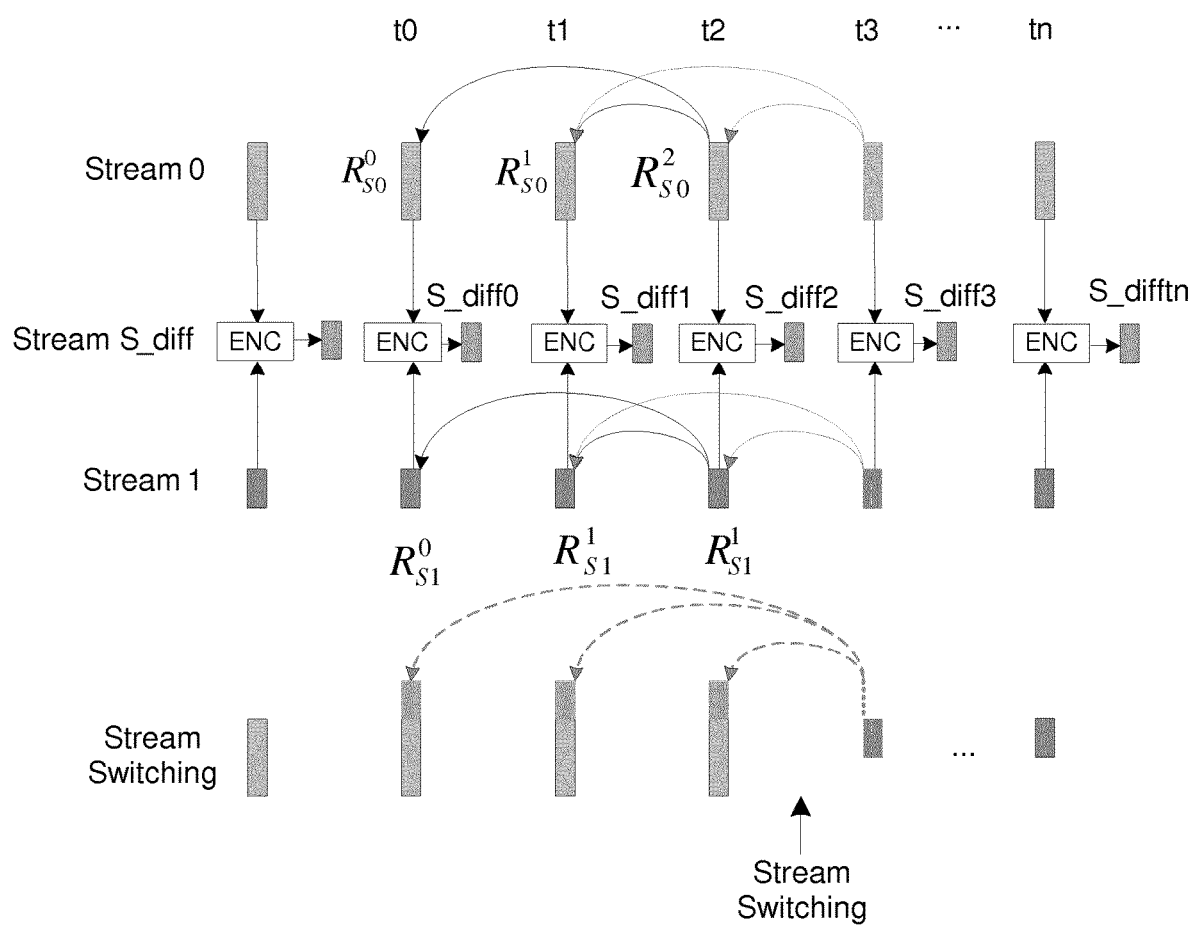
FIG. 7 illustrates the principles of stream switching using SRP pictures according to the invention.

According to a variant, the encoding and decoding methods are used in the context of stream switching as illustrated by FIG. 7. In this case, a first sequence of pictures is encoded in a stream S0. A second sequence of pictures is encoded in a stream S1. Usually, the second sequence of pictures is identical to the first sequence but encoded at a different bit rate, i.e. by using different quantization step. According to a variant, the second sequence of pictures is a rescaled version of the first sequence, i.e. either an up-scaled or a downscaled version. According to a specific embodiment, S0 and S1 have same GOP structure (i.e. same decoding order and same reference picture lists as defined in sections 8.3.1 and 8.3.2 of the HEVC standard).

In addition to the streams S0 and S1, at each time instant to a reconstructed reference picture $R_{S1}^m$ of S1 is further encoded in a stream S_diff as a SRP from a timely corresponding, i.e. temporally aligned, (e.g. identical picture order count) reconstructed reference picture $R_{S0}^m$ of S0 as depicted on FIG. 7. The reconstructed reference picture $R_{S1}^m$ is encoded in S_diff with an information info_tn for identifying the corresponding reconstructed reference picture $R_{S0}^m$. Note that the source picture that corresponds to $R_{S1}^m$ is encoded in S1 and the source picture that corresponds to $R_{S0}^m$ is encoded in S0.

The encoding method disclosed with respect to FIG. 5 is used for decoding a picture block Bc after switching from the first stream S0 to the second stream S1. With respect to FIG. 7, the pictures are decoded and displayed from the stream S0 until time t2. The switch occurs between t2 and t3. After the switch the pictures are decoded and displayed from the stream S1. At the time of the switch a DBP0 comprises several reconstructed reference pictures which where decoded from S0. DPB0 is relative to S0. With respect to FIG. 7, the DPB0 comprises three reconstructed reference pictures $R_{S0}^0$, $R_{S0}^1$ and $R_{S0}^2$ at the switching time.

In the step 10, S_diff1, S_diff2 and S_diff3 are decoded into decoded data (e.g. residues and coding modes) and into information info_t0, info_t1 info_t2 identifying the reconstructed reference pictures $R_{S0}^0$, $R_{S0}^1$, and $R_{S0}^2$ stored in the DPB0.

In the step 12, three special reference pictures SRP_t0, SRP_t1, SRP_t2 are reconstructed from corresponding decoded data and from corresponding reconstructed reference pictures $R_{S0}^0$, $R_{S0}^1$ and $R_{S0}^2$. The reconstructed SRP are then stored in a DPB1 (possibly) different from DPB0. DPB1 is relative to S1. According to a first specific embodiment, S_diff encodes the pixel by pixel difference between $R_{S1}^m$ and the timely corresponding picture $R_{S0}^m$ possibly rescaled. In this case, the reconstructed SRP are SRP_t0=diff_t0+F($R_{S0}^0$), SRP_t1=diff_t1+F($R_{S0}^1$), SRP_t2=diff_t2+F($R_{S0}^2$), wherein diff_t0, diff_t1, diff_t2 are decoded from S_diff. If necessary, $R_{S0}^0$ is rescaled by F so that its size is the same as the size of the current picture Ic. If no rescaling occurs then F is the identity function. According to a second specific embodiment, S_diff encodes $R_{S1}^m$ using $R_{S0}^m$ possibly rescaled by F. In this case, the predictor of a block in $R_{S1}^m$ is either a spatially co-located block in the picture $R_{S0}^m$ or a motion compensated block in $R_{S0}^m$ or derived from spatially neighboring blocks in $R_{S1}^m$ (spatial intra prediction). In the case of the first specific embodiment, when no rescaling is necessary, i.e. when the sizes of the pictures of the first and second stream are identical, then the same difference pictures diff_t0, diff_t1 and diff_t2 can be used to switch from S0 to S1 or from S1 to S0. In the previous example, if diff_t0 encodes the difference between $R_{S0}^0$ and the timely corresponding picture $R_{S1}^0$ in the stream S1 instead of the inverse diff_t0 is subtracted from $R_{S0}^0$ instead of being added in order to reconstruct SRP_t0. A sign is thus decoded to specify if the reconstructed reference pictures are modified by adding or by subtracting the difference picture.

In the step 16, Bc is reconstructed from reconstructed reference pictures in DPB1. Just after the switch, DPB1 comprises the three SRPs.

The invention is clearly not limited to the case of 3 reconstructed reference pictures. According to a specific embodiment of the invention, for all reconstructed reference pictures in the DPB0 a special reference picture is reconstructed at step 12 and stored in DPB1. According to a variant, a SRP is reconstructed only for each reconstructed reference pictures in the DPB0 that are to be used as reference pictures after the switch.

According to a variant, a flag f13 is encoded (respectively decoded) for example in the VPS or a SEI indicating that the subsequently encoded (respectively decoded) pictures with a given layer_id are not using any inter-layer prediction. More precisely, the pictures encoded (respectively decoded) after the flag are not using any inter-layer prediction.

Figure 8:
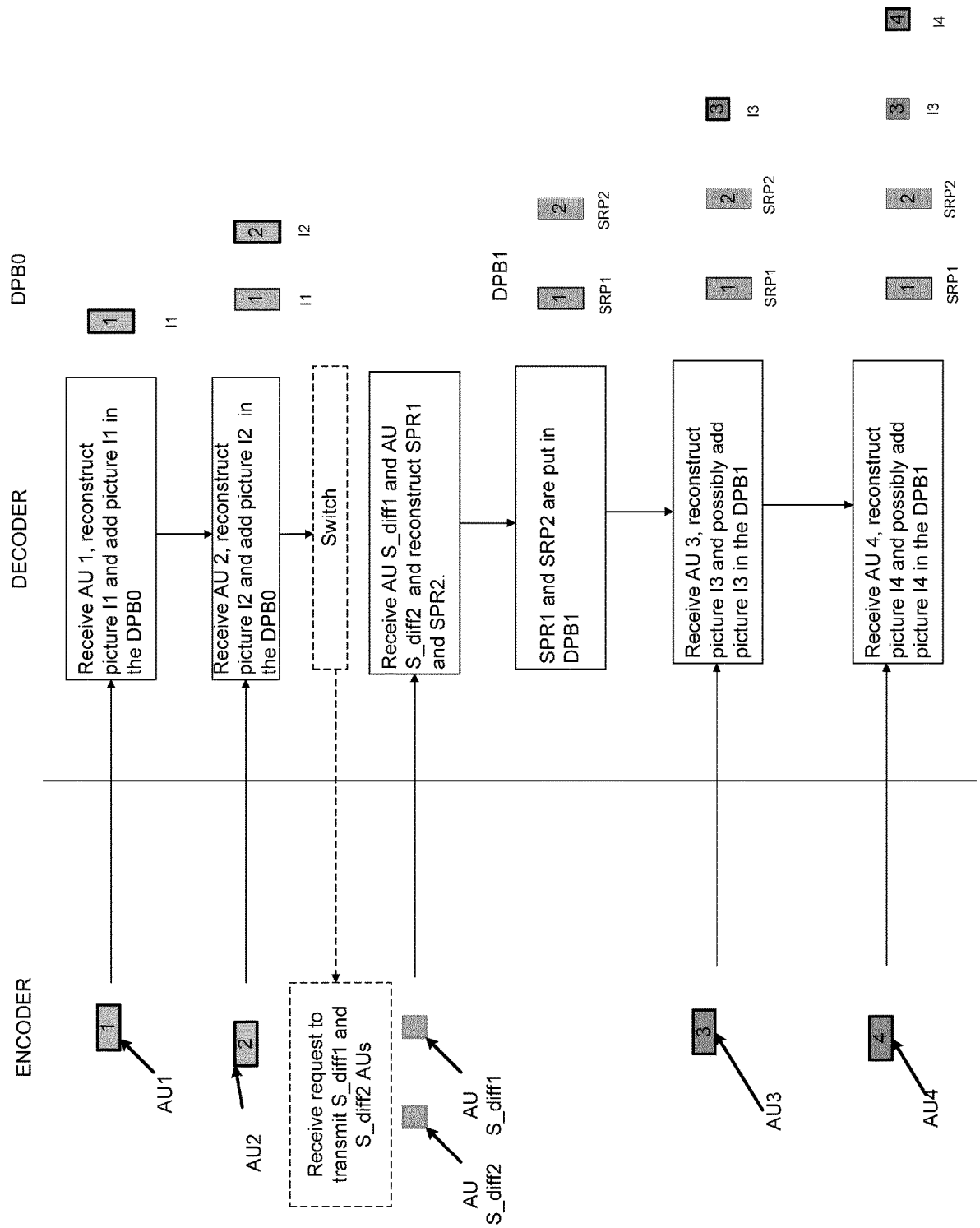
FIG. 8 illustrates a further embodiment of the decoding method according to the invention.

FIG. 8 illustrates a further embodiment of the decoding method according to a specific and non-limitative embodiment. The decoder receives different Access Units. The Access Unit AU1 is first received and decoded. A first picture I1 is reconstructed from the decoded AU1. Then, a second Access Unit AU2 is received and decoded. A second picture I2 is reconstructed from the decoded AU2. The picture I1 and I2 belongs to the same stream S0 and are stored in the DPB0 if they are signaled as used as reference pictures. Then, a switch occurs. The switch can be requested by the decoder that sends a request to the encoder for receiving the S_diff stream. According to a variant, the switch is initiated by the encoder. Following the switch, the decoder receives two AU units S_diff1 and S_diff2. S_diff1 and S_diff2 (step 10) are decoded in order to reconstruct (step 12) SRP1 and SRP2 using the picture I1 and I2 respectively. SRP1 and SRP2 are two special reference pictures. SRP1 and SRP2 are then put in the DPB1 that is relative to S1. Then the decoder receives AU3 and decodes it. A picture I3 is reconstructed from the decoded AU3 and possibly from at least one picture of the DPB1 (temporal prediction), i.e. either SRP1 or SRP2. I3 belongs to the second stream S1 and is possibly stored in the DPB1 for future use as a reconstructed reference picture. The decoder then receives AU4 and decodes it. A picture I4 is reconstructed from the decoded AU4 and possibly from at least one picture of the DPB1 (temporal prediction). Pictures I1, I2, I3 and I4 are displayed while SRP1, SRP2 are not. Indeed, only one of the two temporally aligned pictures is displayed. SRP1 is temporally aligned with I1 while SRP2 is temporally aligned with I2.

According to a specific embodiment of the invention, the pictures of the first and second sequences and the special reference pictures are encoded into a multi-layered stream. As a specific example, the pictures identified as special reference pictures are encoded as an enhancement layer of a scalable stream that is dependent from another layer (stream S0), e.g. a base layer, in which the pictures of the first sequence are encoded. A first layer is dependent from a second layer if it needs information from this second layer for being decoded. The enhancement layer allows to reconstruct from reconstructed reference pictures of S0, special reference pictures to be used as reference picture for reconstructing pictures of S1 after the switch from S0 to S1. This enhancement layer is for example compliant with SVC or SHVC coding standard. According to a specific embodiment of the invention, the special reference pictures are encoded with a subset of the encoding tools/modes provided by SVC or SHVC for encoding enhancement layer. According to another embodiment of the invention, intra-layer motion vector prediction (temporal prediction) is disabled in SVC or SHVC coding standard. On the contrary, intra prediction from the S0 layer is activated. The intra picture prediction may be activated too. According to another embodiment, the temporal my prediction is disabled for coding S0 and S1 for example by setting the HEVC flag slice_temporal_mvp_enable_flag to false. This means that the motion vector prediction (MV prediction) is built using MV from reconstructed neighboring coding units, but not using the MVs of previously reconstructed reference pictures.

In the following FIGS. 9 and 10, encoding and decoding modules are referred to as encoder and decoder.

Figure 9:
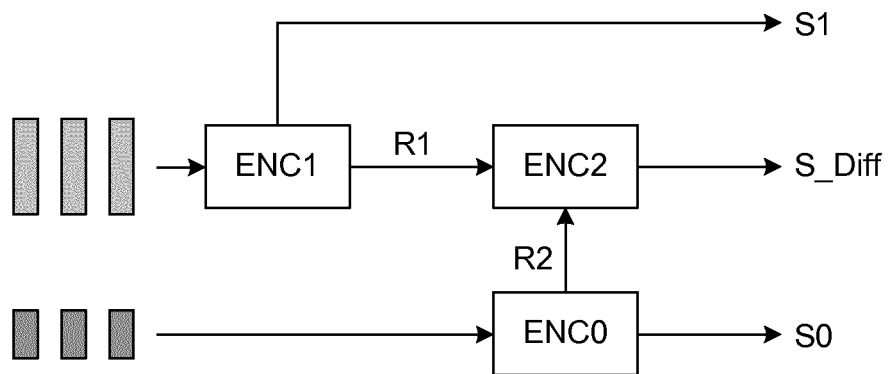
FIG. 9 depicts a multi-layer video decoder according to the invention.

FIG. 9 depicts a multi-layer encoder according to a specific and non-limitative embodiment. The pictures of the first sequence are encoded in S0 using a first encoder ENC0 which is a mono-layer encoder for example an MPEG2, H.264 or an HEVC compliant encoder. The invention is not limited by the mono-layer encoder used. The reference pictures encoded with ENC0 are reconstructed as R2 and provided as input to a third encoder ENC2. A second encoder ENC1 is used to encode the pictures of the second sequence in S1. The invention is not limited by the encoder used. The reference pictures encoded with ENC1 that timely correspond to the reconstructed reference pictures R2 are reconstructed as R1 and provided as input to the third encoder ENC2. Therefore, for each reconstructed reference picture R2 in the DPB of ENC0, a timely corresponding reference picture R1 is reconstructed. The encoder ENC2 thus encodes the reconstructed reference pictures R1 from the timely corresponding reconstructed reference picture R2 possibly rescaled into the stream S_diff. According to a specific embodiment the encoder ENC2 comprises a subtracter for subtracting R2 (possibly rescaled) from R1 and further an entropy coder for encoding the difference picture thus obtained possibly transformed and quantized. According to a variant, from each block of R1 a predictor is subtracted, wherein the predictor is either a spatially co-located block in the picture R2 (possibly rescaled) or a motion compensated block in R2 (possibly rescaled) or derived from spatially neighboring blocks in R1 (spatial intra prediction). A residue is thus obtained and is further entropy coded after possibly being transformed and quantized. In this case, what is encoded in S_diff is not a simple pixel by pixel difference between R1 and R2. An information INFO identifying the reconstructed reference picture R2 used to encode the reconstructed reference picture R1 is also encoded in S_diff. The encoder ENC2 is for example compliant with a scalable video encoder such as SVC or SHVC. The invention is not limited by the scalable encoder used. Scalable video codec standards define layer_id indicator to separate/distinguish the AU belonging to one Layer (BL) from the ones belonging to another Enhancement Layers. According to a specific embodiment, the AU coming from ENC0 are encoded with a given layer_id which is different from the layer_id used to encode the AUs coming from ENC2. The AUs coming from ENC1 and the AU coming from ENC2 have the same layer_id. According to an advantageous embodiment, ENC1 and ENC2 can be one and the same encoding module.

Figure 10:
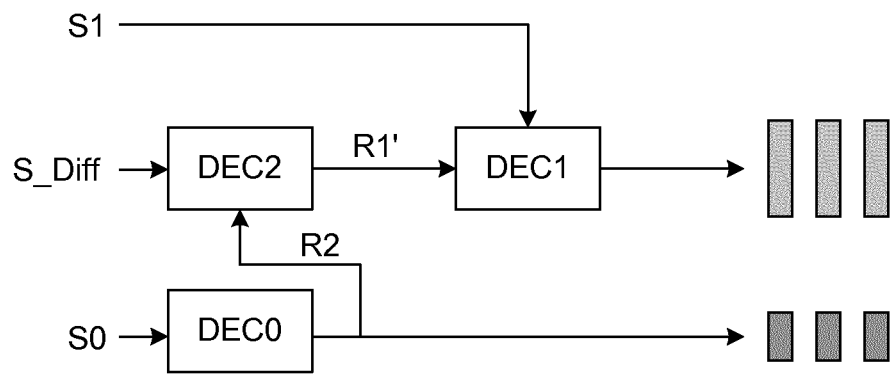
FIG. 10 depicts a multi-layer video encoder according to the invention.

FIG. 10 depicts a multi-layer decoder according to a specific and non-limitative embodiment. The first stream S0 is decoded using a first decoder DEC0 which is a mono-layer decoder for example an MPEG2, an H.264 or an HEVC compliant decoder. The invention is not limited by the mono-layer decoder used. The decoder DEC0 reconstructs pictures from the first stream S0, in particular the reference pictures R2 which are stored in the DPB0. A second decoder DEC1 is used to reconstruct pictures from the second stream S1. The invention is not limited by the decoder used. A decoder DEC2 decodes (step 10) from the stream S_diff information INFO for identifying a reconstructed reference picture R2 in the DPB0. The decoder DEC2 is for example compliant with a scalable video decoder such as SVC or SHVC. The invention is not limited by the scalable decoder used. The decoder DEC2 further reconstructs (step 12) a special reference picture R1' from the temporally aligned reconstructed reference picture R2 possibly rescaled and from data (e.g. residues, coding modes) decoded from S_diff. According to a specific embodiment, the decoder DEC2 comprises an entropy decoder for decoding a residue from S_diff and an adder for adding the residue to a predictor, wherein the predictor is derived either from co-located or motion-compensated blocks in R2 possibly rescaled or from reconstructed samples in R1' (intra picture prediction). The special reference picture R1' is then put in the DPB1.

According to an advantageous embodiment, DEC1 and DEC2 can be one and the same decoding module.

Figure 11:
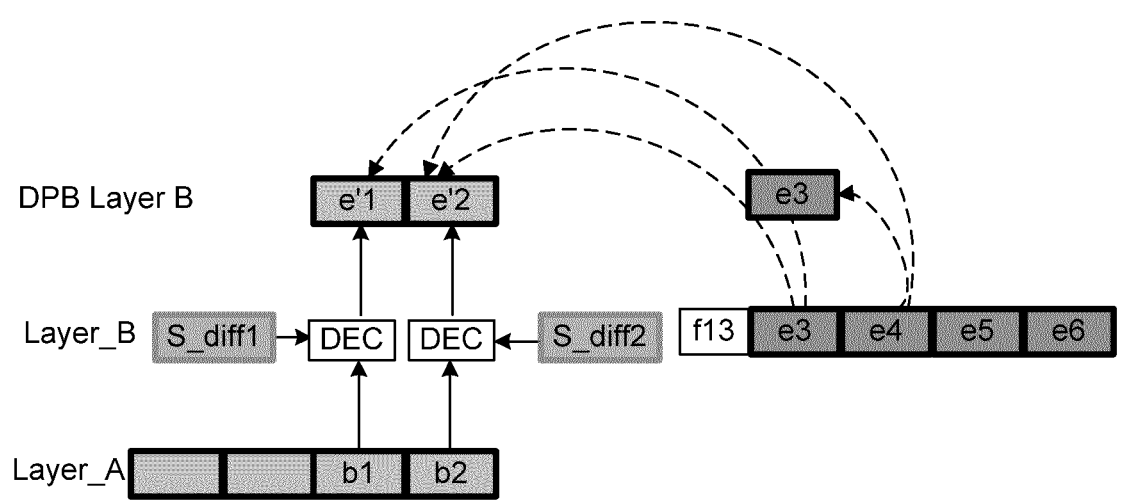
FIG. 11 represents a multi-layered stream according to the invention.

FIG. 11 represents a multi-layered stream according to a specific and non-limitative embodiment. On this figure the dashed lines represents the picture dependencies. AU1 and AU2 with layer_id=Layer_A are received and decoded. Reference picture b1 and b2 are reconstructed from decoded AU and stored in the DPB_A of Layer_A. Upon switching, the AUs S_diff1 and S_diff2 with layer_id=Layer_B are received and decoded. The decoder DEC2 then reconstructs special reference pictures e'1 and e'2 from data decoded from S_diff1 and from S_diff2 and further from b1 and b2 identified by information info_1 and info_2 decoded from S_diff1 and S_diff2 respectively. The special reference pictures e'1 and e'2 which are temporally aligned with b1 and b2 respectively are stored in the DPB_B of Layer_B. Then, an AU3 is received and decoded. A picture e3 is reconstructed from this decoded AU3 and further from the special reference pictures e'1 and e'2. The reconstructed picture e3 is stored in the DPB_B since e3 is used as reconstructed reference picture for e4. An AU4 is received and decoded. A picture e4 is reconstructed from the decoded AU4 and further from the special reference picture e'2 and the reconstructed reference picture e3. The following AU5 and AU6 are received and decoded. Corresponding pictures e5 and e6 are reconstructed from decoded AU5 and AU6. The DPB_B is possibly updated by adding e5 and e6 if the reconstructed pictures are used as reference pictures. e'1 is preferentially an approximation of e1 one of the reconstructed reference pictures used when encoding e3. e'2 is preferentially an approximation of e2 one of the reconstructed reference pictures used when encoding e3 and e4. Advantageously, a flag f13 is encoded (respectively decoded), for example in the VPS or in a SEI, indicating that the subsequently encoded (respectively decoded) decoded pictures with a given layer_id are not using any inter-layer prediction. More precisely, the pictures encoded (respectively decoded) after the flag are not using any inter-layer prediction.

Encoding the pictures of the first and second sequences and the special reference pictures into a multi-layered stream makes it possible to reconstruct two reference pictures temporally aligned (b1 and e'1 or b2 and e'2), e.g. having a same POC. Indeed, in the multi-layer approach different DPBs are used. Specifically, one DPB is used per layer. Consequently, the temporally aligned reconstructed reference pictures are stored in different DPBs. Decoding a multi-layer stream classically requires decoding a layer of level N before decoding a layer of level N+1, where N is an integer, because of layers' dependency. Such a dependency between layers is not compatible with a stream switching application. Advantageously, encoding the flag f13 introduces independency between layers and thus renders scalable encoding/decoding suitable for stream switching applications.

The encoding and decoding methods according to the invention makes it possible to realize flexible stream switching while having a small bit rate overhead only when switching occurs. These methods are suitable for any GOP structure, any number of reconstructed reference pictures and even when decoding order is different from display order.

An example of a syntax is provided below within the SHVC coding standard framework for the S_diff stream.

| slice_type | Name of slice_type |
|---|---|
| 0 | B (B slice) |
| 1 | P (P slice) |
| 2 | I (I slice) |
| 3 | SRP (SRP slice) |

A slice_type is added to identify a slice of a special reference picture.

| | Descriptor |
|---|---|
| slice_segment_header( ) { | |
|   first_slice_segment_in_pic_flag | u(1) |
|   ... | |
|   if( !dependent_slice_segment_flag ) { | |
|     for ( i = 0; i < num_extra_slice_header_bits; i++ ) | |
|       slice_reserved_undetermined_flag[ i ] | u(1) |
|     slice_type | ue(v) |
|   ... | |
| === Begin No IDR === | |
|   if( !IdrPicFlag ) { | |
|   ... | |
|   } | |
| === End No IDR === | |
|   ... | |
| === Begin P or B === | |
|   if( slice_type == P || slice_type == B ) { | |

-continued

| | Descriptor |
|---|---|
|   ... | |
|   } | |
| === End P or B === | |
| === Begin SRP === | |
|   If (slice_type == SRP) { | |
| === i2 === | |
|     sign_diff_pic | u(1) |
| === i4 === | |
| === i12=== | |
|     num_layer_id_diffpic_apply | u(6) |
|   } | |
| === End SRP === | |
|   ... | |
| } | | sign_diff_pic equal to 1 indicates the residuals should be added to the prediction, else the residuals should be substracted to the prediction.

pic_order_cnt_diffpic_lsb specifies the picture order count modulo MaxPicOrderCntLsb for this special reference picture. Then the intra BL prediction will use the reference picture in the DPB with same pic_order_cnt. The length of the pic_order_cnt_lsb syntax element is log 2_max_pic_order_cnt_lsb_minus4+4 bits. The value of the pic_order_cnt_diffpic_lsb shall be in the range of 0 to MaxPicOrderCntLsb−1, inclusive. When pic_order_cnt_diffpic_lsb is not present, pic_order_cnt_diffpic_lsb is inferred to be equal to 0.

delta_poc_msb_diffpic_cycle_lt is used to determine the value of the most significant bits of the picture order count value of the long-term reconstructed reference picture in the DPB that is used to reconstruct this special reference picture. When delta_poc_msb_cycle_lt is not present, it is inferred to be equal to 0 num_layer_id_diffpic_apply indicates the num_layer_id of the reconstructed reference pictures used to decode this special reference picture.

Examples of Syntax (Vps Extension):

| | Descriptor |
|---|---|
| video_parameter_set_rbsp ( ) { | |
|   ... | |
|   diff_pic_flag_enabled | U(1) |
|     if ( diff_pic_flag_enabled ) { | |
|       inter_layer_pred_for_non_diff_pictures_flag | u(1) |
|     } | |
| } | | diff_pic_flag_enabled equal to 1 indicates that inter_layer_pred_for_non_diff_picture_flag are coded.

inter_layer_pred_for_non_diff_picture_flag equal to 1 indicates that any subsequent picture of type I, P or B does not use inter-layer prediction, but pictures of type SRP may use inter layer prediction, but not temporal intra layer prediction.

The video coder and decoder according to the invention and depicted on FIGS. 9 and 10 are for example implemented in various forms of hardware, software, firmware, special purpose processors, or a combination thereof. Preferably, the present principles may be implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) that is executed via the operating system. In addition, various other peripheral devices may be connected to the computer platform such as an additional data storage device and a printing device.

According to variants, the coding and decoding devices according to the invention are implemented according to a purely hardware realisation, for example in the form of a dedicated component (for example in an ASIC (Application Specific Integrated Circuit) or FPGA (Field-Programmable Gate Array) or VLSI (Very Large Scale Integration) or of several electronic components integrated into a device or even in a form of a mix of hardware elements and software elements.

The invention claimed is:

1. A decoding method comprising:
    while inter-layer prediction is enabled, reconstructing a second layer reference picture from a first layer reference picture of a decoder picture buffer of a scalable multi-layered stream and from data decoded from a second layer of the scalable multi-layered stream and storing the reconstructed second layer reference picture in the decoder picture buffer, wherein the reconstructed second layer reference picture is indicated as not to be displayed;
    decoding a flag indicating that a subsequently decoded picture of the second layer is not using any inter-layer prediction, wherein inter-layer prediction is disabled after decoding the flag; and
    reconstructing a picture block of the subsequently decoded picture at least from the reconstructed second layer reference picture.

2. The decoding method according to claim 1, wherein the data decoded from the second layer are representative of a pixel-by-pixel difference between the second layer reference picture and the first layer reference picture.

3. The decoding method according to claim 1, wherein the first layer is a base layer.

4. The decoding method of claim 1, further comprising decoding from the second layer information for identifying the first layer reference picture.

5. The decoding method of claim 1, wherein the second layer reference picture and the first layer reference picture are temporally aligned.

6. The decoding method according to claim 1, wherein a part of the second layer is configured to be decoded using information from the first layer.

7. An encoding method comprising:
    while inter-layer prediction is enabled, encoding in a second layer of a multi-layered stream a second layer reference picture of a decoder picture buffer from a first layer reference picture of the decoder picture buffer of the scalable multi-layered stream, wherein the second layer reference picture is indicated as not to be displayed;
    encoding a flag indicating that a subsequently encoded picture of the second layer is not using any inter-layer prediction, wherein inter-layer prediction is disabled after decoding the flag; and
    encoding a picture block of the subsequently encoded picture at least from the second layer reference picture.

8. The encoding method according to claim 7, wherein encoding in the second layer the second layer reference picture comprises determining the pixel-by-pixel difference between the second layer reference picture and the first layer reference picture and encoding the pixel-by-pixel difference.

9. The encoding method according to claim 7, wherein the first layer is a base layer.

10. The encoding method of claim 7, further comprising encoding in the second layer information for identifying the first layer reference picture.

11. The encoding method of claim 7, wherein the second layer reference picture and the first layer reference picture are temporally aligned.

12. A decoder comprising at least a processor configured to:
    while inter-layer prediction is enabled, reconstruct a second layer reference picture from a first layer reference picture of a decoder picture buffer of a scalable multi-layered stream and from data decoded from a second layer of the scalable multi-layered stream and store the reconstructed second layer reference picture in the decoder picture buffer, wherein the reconstructed second layer reference picture is indicated as not to be displayed;
    decode a flag indicating that a subsequently decoded picture of the second layer is not using any inter-layer prediction, wherein inter-layer prediction is disabled after decoding the flag; and
    reconstruct a picture block of the subsequently decoded picture at least from the reconstructed second layer reference picture.

13. The decoder according to claim 12, wherein the data decoded from the second layer are representative of a pixel-by-pixel difference between the second layer reference picture and the first layer reference picture.

14. The decoder according to claim 12, wherein the first layer is a base layer.

15. The decoder according to claim 12, wherein the at least one processor is further configured to decode from the second layer information for identifying the first layer reference picture.

16. The decoder according to claim 12, wherein the second layer reference picture and the first layer reference picture are temporally aligned.

17. An encoder comprising at least a processor configured to:
    while inter-layer prediction is enabled, encode in a second layer of a scalable multi-layered stream a second layer reference picture of a decoder picture buffer from a first layer reference picture of the decoder picture buffer of the scalable multi-layered stream, wherein the second layer reference picture is indicated as not to be displayed;
    encode a flag indicating that a subsequently encoded picture of the second layer is not using any inter-layer prediction, wherein inter-layer prediction is disabled after decoding the flag;
    encode a picture block of the subsequently encoded picture at least from the second layer reference picture.

18. The encoder according to claim 17, wherein to encode in the second layer the second layer reference picture comprises determining the pixel-by-pixel difference between the second layer reference picture and the first layer reference picture and encoding the pixel-by-pixel difference.

19. The encoder according to claim 17, wherein the first layer is a base layer.

20. The encoder according to claim 17, wherein the second layer reference picture and the first layer reference picture are temporally aligned.

21. The decoder according to claim 17, wherein the at least one processor is further configured to encode in the second layer information for identifying the first layer reference picture.

* * * * *